(No Model.)  H. F. NEHR.  2 Sheets—Sheet 1.
CABLE RAILWAY.

No. 437,711.  Patented Oct. 7, 1890.

Witnesses
H. W. Elmore
M. M. Westafer

Inventor
Herman F. Nehr.

By his Attorneys
Finnie & Goldsborough (No Model.) 2 Sheets—Sheet 2.
H. F. NEHR.
CABLE RAILWAY.
No. 437,711. Patented Oct. 7, 1890.
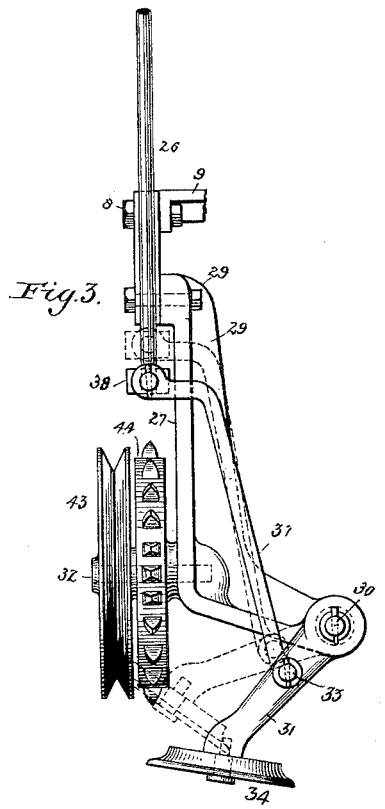
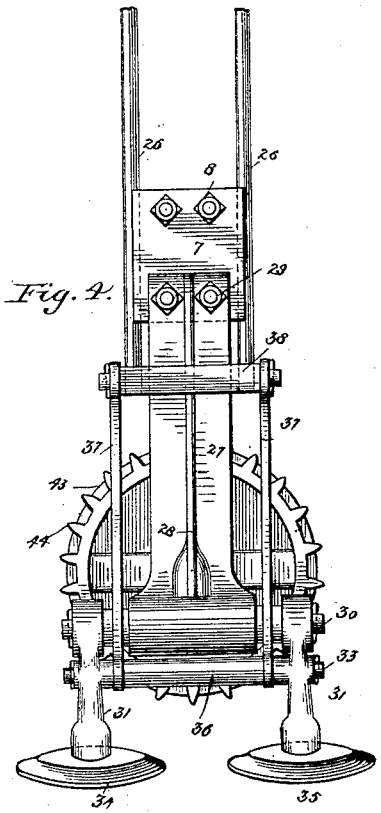
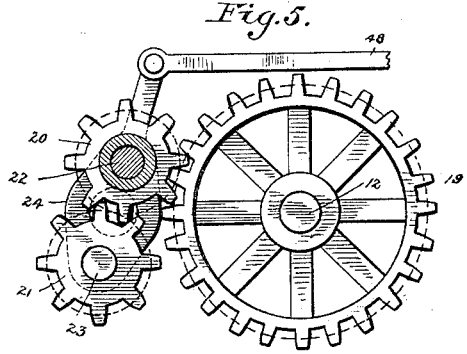
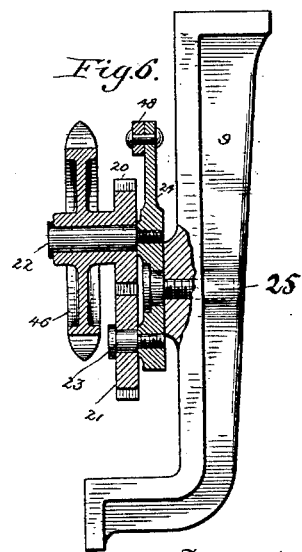
Witnesses
H. W. Elmore
M. M. Westafer
Inventor
Herman F. Nehr
By his Attorneys
Pennie & Goldsborough

UNITED STATES PATENT OFFICE.

HERMAN F. NEHR, OF NEWARK, NEW JERSEY, ASSIGNOR TO THE CABLE MOTOR TRACTION COMPANY.

CABLE RAILWAY.

SPECIFICATION forming part of Letters Patent No. 437,711, dated October 7, 1890.

Application filed December 4, 1889. Serial No. 332,574. (No model.)

*To all whom it may concern:*

Be it known that I, HERMAN F. NEHR, a citizen of the United States, residing at Newark, in the county of Essex and State of New Jersey, have invented certain new and useful Improvements in Cable Railways; and I do hereby declare the following to be a full, clear, and exact description of the invention, such as will enable others skilled in the art to which it appertains to make and use the same.

My invention relates to that class of cable railways wherein the motive power is transmitted from the cable to the vehicle axle or axles through the intermediacy of intervening gearing.

The object of my invention is to provide a construction and arrangement of parts in cable railways of the general character referred to, whereby a cable of smaller diameter and weight may be successfully employed without loss of speed or effective power in place of the larger and heavier cables ordinarily in use for the purpose, thereby lessening the first cost of the cable employed, reducing the amount of friction along the line, and effecting a most important and considerable decrease in the power required to propel or drag the cable itself.

Incidental to the securing of the results referred to I have also devised certain specific improvements in the construction and arrangement of the details constituting the general structure, whereby the latter is made simple and economical in point of manufacture, strong and durable in use, and capable of being readily and conveniently manipulated, all of which will be hereinafter more fully described, and particularly set forth in the claims.

Figure 1:
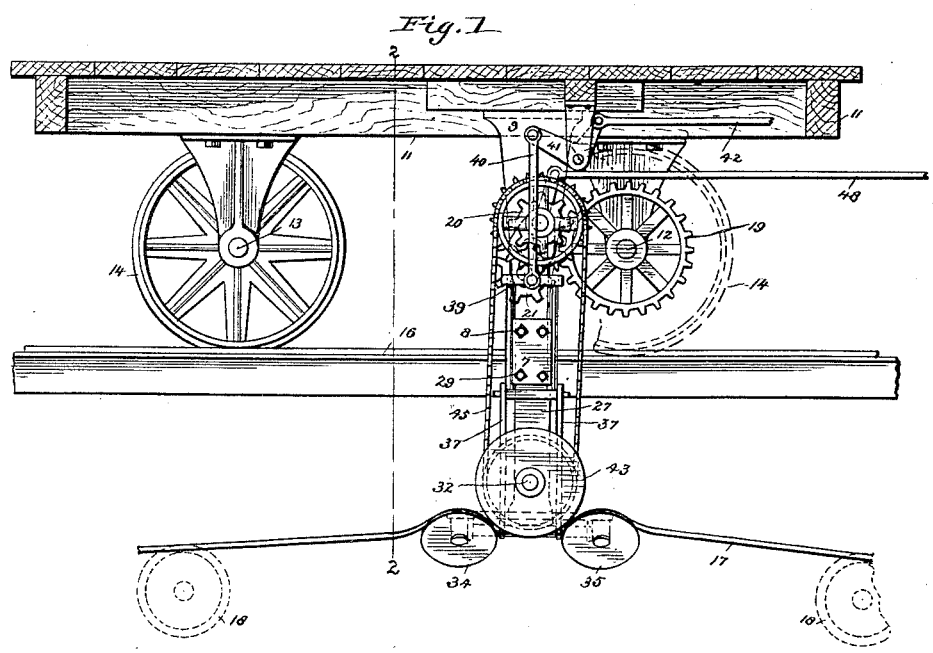
Figure 2:
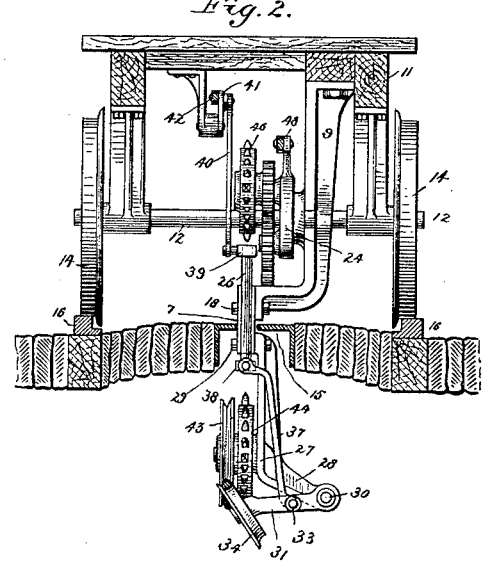

In the drawings hereunto annexed and forming a part of this specification, Figure 1 represents a longitudinal vertical section, partly broken away, of a portion of a cable railway and its vehicle embodying my improvements. Fig. 2 represents a vertical cross-section and partial elevation of the same, taken on a plane indicated by the line 2 2 of Fig. 1. Fig. 3 represents in end elevation the lower part of a swinging bracket forming a part of the general structure. Fig. 4 represents a side elevation thereof. Figs. 5 and 6 represent in side elevation and vertical section the means for reversing the movement of the vehicle as occasion may require.

Similar numerals of reference indicate similar parts throughout the several views.

Referring to the drawings, 11 indicates a car or similar vehicle provided with rotary axles, as 12 13, and traction-wheels 14, adapted to run upon suitable rails 16, spaced at opposite sides of the slot 15 of a cable-railway conduit. Within said conduit is located the traveling cable 17, actuated from the terminal stations of the line in the usual manner and supported from point to point by carrier-sheaves 18.

Upon one of the rotary car-axles, as 12, is fixed the cog-gear 19, which engages with one or the other of the two intermeshing cog-gears 20 21, mounted to turn freely upon bearing pins or gudgeons 22 23. The said gudgeons are attached to and project from a swinging plate 24, supported by a pivot-pin 25 from a hanger 9, bolted rigidly to a portion of the bottom frame-work of the car.

To the lower part of the hanger 9 is bolted at 8 a depending plate 7, having guide-grooves, within which fit loosely the vertically-movable rods 26, as hereinafter described.

A rearwardly and downwardly projecting angle-piece 27, having a strengthening-rib 28, is bolted at 29 to the lower part of the plate 7, and at its rear end is cored out to form a bearing for a horizontal rock-shaft 30. At opposite ends of the said rock-shaft 30 are fixed the swinging arms 31, connected together by a cross-pin 33 and carrying, respectively, at their outer ends the idle wheels or sheaves 34 35.

A sleeve 36 fits over the central portion of the pin 33, and bent swinging links 37 connect said pin with a cross-bar 38, to which the rods 26, above referred to, are attached. A similar cross-bar 39 connects the upper ends of the rods 26, and a link 40 connects said cross-bar 39 with a bell-crank lever 41, having an operating-rod 42 extending to some portion of the car where it can be readily manipulated by the operator.

To the front face of the angle-piece 27 is attached a suitable gudgeon 32, upon which is mounted the driving-sheave 43 and connected sprocket or belt wheel 44. A sprocket chain or belt 45 transmits motion from the wheel 44 to the similar wheel 46, connected to the gear 20.

The cable 17 passes under the pulley or driving sheave 43, as indicated in the figures of the drawings, and the swinging sheaves 34 35 are normally swung back into the position represented in full lines in Figs. 3 and 4, so as to entirely clear the cable, which latter, when thus in the dropped position, rests upon the carrier-sheaves 18. In this position of adjustment the car or vehicle 11 is at rest and entirely disconnected from the traveling cable. When now it is desired to propel the car from the cable, the operator actuates the draw-rod 42, so as to tilt the bell-crank lever 41 forward upon its pivot, thereby raising the link 40 and with it the rods 26, swinging links 37, and swinging arms 31. The lifting-sheaves 34 35 accordingly swing forward beneath the cable 17 and raise it from the carrier-sheaves 18 and rise to a plane higher than the latter, so as to pass or clear them during the forward or rearward movement of the car. The lifting-sheaves 34 35 bring the cable 17, in the manner described, in frictional contact with the bottom of the driving-sheave 43, thereby causing the latter to revolve, and the movement of rotation thus produced is transmitted through the sprocket or belt wheel 44, sprocket or chain 45, wheel 46, and gears 19 20 to the vehicle axle and wheels, thereby driving the car.

The speed of the car will depend upon the ratio of the gearing between the vehicle-wheels 14 and the driving-sheave 43. In practice this is attended with the marked advantage that it enables me to adopt such relative proportions as to make the speed of the car approximate very closely the speed of movement of the cable through the conduit—that is, I make the ratio of the driving-sheave 43 to the vehicle-wheels 14 the same as the ratio of the cog 20 to the cog 19. I thus attain all the advantages possessed by a grip-cable traveling at a like rate of progression, while at the same time using a cable of much smaller size than would be required for a like number of grip-cars. The strain and wear upon the cable are, moreover, much less than where, as in grip-cables, the cars are imposed as a dead-weight upon the cable at points along its length. As a result, therefore, I effect a saving both in the first cost of the cable and in its wear and tear, and also in the power required to propel or drag it through the conduit. It is of course evident that the direction of travel of the car will depend upon which one of the cogs 20 or 21 of the reversing-gear is thrown into engagement with the cog 19, the construction being such that by tilting the swinging plate 24 forward or backward, as the case may be, by means of the operating-rod 48 one or the other of the cogs 20 21 is thrown into engagement with the cog 19.

It is evident that, instead of the cog-gears 20, 21, and 19, I may employ friction wheels or disks, as indicated by dotted lines in Fig. 5. The employment of friction-gear, as described, for the cog-gearing has the advantage that it obviates the danger of breakage of cog-teeth and enables the speed of the vehicle to be varied by permitting the operator to lessen the force of the frictional contact, thereby permitting a slip of the friction-disks upon each other and decreasing correspondingly the speed of transmission to the car-wheels.

Having thus described my invention, what I claim is—

1. In a cable railway, the combination, with the vehicle and its wheels, of a traveling cable, a driving-sheave actuated by said cable and of smaller size than the vehicle-wheels, and gearing intermediate of the driving-sheave and vehicle-wheels, the gearing ratio corresponding to the ratio of the driving-sheave to the vehicle-wheels, substantially as described.

2. In a cable railway, the combination, with the traveling cable, of a hanger carrying a driving-sheave actuated by said cable and normally out of contact therewith, swinging lift-sheaves, also carried by said hanger for raising the cable into frictional contact with the driving-sheave, and gearing intermediate of the driving-sheave and vehicle-wheels, substantially as described.

3. In a cable railway, the combination, with the traveling cable, of a driving-sheave actuated by said cable and normally out of contact therewith, swinging lift-sheaves for raising the cable into frictional contact with the driving-sheave, and gearing intermediate of the driving-sheave and vehicle-wheels, and a reversing-gear, whereby the car may be driven in the direction of travel of the cable or in a reverse direction, substantially as described.

4. In a cable railway, the combination, with the traveling cable, of a driving-sheave actuated by said cable and normally out of contact therewith, a hanger upon which said driving-sheave is mounted, swinging lift-sheaves for raising the cable into frictional contact with the driving-sheave, said lift-sheaves being pivoted to the hanger, rods and links for raising and lowering the lift-sheaves, and gearing intermediate of the driving-sheave and vehicle-wheels, substantially as described.

5. In a cable railway of the kind described, the combination, with the driving-sheave having a horizontal axis, of lift-sheaves arranged on opposite sides thereof and having inclined axes, substantially as described.

6. In a cable railway, the combination, with the traveling cable, of a driving-sheave actuated by said cable and normally out of contact therewith, a hanger consisting of three parts, the lower part of said hanger serving as a bearing for the driving-sheave and for lift-sheaves pivoted to said lower part, rods for raising and lowering the lift-sheaves, said rods being guided by the middle part of the hanger, a sprocket or belt wheel connected to the driving-sheave, a sprocket or belt wheel and connected cog-gear mounted upon the upper part of the hanger, a connecting sprocket chain or belt, and a gear mounted upon the vehicle-axis, substantially as described.

7. In a cable railway, the combination, with the traveling cable, of the driving-sheave 43 and connected wheel 44, mounted upon the lower part of the hanger, the lift-sheaves 34 35, swinging arms 31, pivoted also to the lower part of the hanger, links 37, rods 26, guide-plate 7, rod 40, bell-crank lever 41, operating draw-rod 42, upper hanger portion 9, wheel 46 and connected cog-gear 20, belt or sprocket-chain 45, and cog-gear 19, mounted upon the vehicle-wheel axis, substantially as described.

In testimony whereof I affix my signature in presence of two witnesses.

HERMAN F. NEHR.

Witnesses:
 ARTHUR DEVINE,
 JOHN P. DENGLER.